United States Patent
Yavor et al.

(10) Patent No.: US 7,362,972 B2
(45) Date of Patent: Apr. 22, 2008

(54) LASER TRANSMITTER CAPABLE OF TRANSMITTING LINE DATA AND SUPERVISORY INFORMATION AT A PLURALITY OF DATA RATES

(75) Inventors: Gabriel Yavor, Ottawa (CA); Jerry Zeng, Kanata (CA); Yuan Lin, Nepean (CA)

(73) Assignee: JDS Uniphase Inc., Ottawa, Ontario (CA)

( * ) Notice: Subject to any disclaimer, the term of this patent is extended or adjusted under 35 U.S.C. 154(b) by 513 days.

(21) Appl. No.: 10/950,553

(22) Filed: Sep. 28, 2004

(65) Prior Publication Data

US 2005/0105901 A1 May 19, 2005

Related U.S. Application Data

(60) Provisional application No. 60/506,175, filed on Sep. 29, 2003.

(51) Int. Cl.
*H04B 10/08* (2006.01)
(52) U.S. Cl. ....................................................... 398/30
(58) Field of Classification Search ............ 398/30–32, 398/182–189
See application file for complete search history.

(56) References Cited

U.S. PATENT DOCUMENTS

| | | | |
|---|---|---|---|
| 5,956,165 A | 9/1999 | Fee et al. | 398/78 |
| 6,549,311 B1 | 4/2003 | Hakki et al. | 359/124 |
| 7,099,244 B2 * | 8/2006 | Nakata et al. | 369/47.19 |
| 7,177,601 B1 * | 2/2007 | Kurk et al. | 455/73 |
| 2005/0078351 A1 * | 4/2005 | Avallone et al. | 359/334 |
| 2005/0152694 A1 * | 7/2005 | Chown | 398/30 |
| 2007/0077065 A1 * | 4/2007 | Forsberg et al. | 398/30 |

OTHER PUBLICATIONS

System Characterization of Optical ASK/DPSK Orthogonal Modulation for Supervisory Information Dissemination by Yang et al., Department of Information Engineering, The Chinese University of Hong Kong, Shatin, N.T., Hong Kong, 2003.

* cited by examiner

*Primary Examiner*—Kenneth Vanderpuye
*Assistant Examiner*—Phyowai Lin
(74) *Attorney, Agent, or Firm*—Teitelbaum & MacLean; Neil Teitelbaum; Doug MacLean (57) ABSTRACT

An optical transmitter for sending supervisory data signals and line data signals as a composite optical signal through an optical fiber link is disclosed. The transmitter may take the form of a transmitter, transceiver or transponder and includes circuitry for receiving incoming line data bit rate information for varying and or controlling the modulation index by varying the supervisory carrier frequency amplitude in dependence upon the line data bit rate.

17 Claims, 8 Drawing Sheets

High speed line data: SONET, GE, etc.

Figure 3b

Supervisory channel binary data

Figure 3c

FSK modulated supervisory signal

Figure 3d

Transmitted optical Composite signal

LASER TRANSMITTER CAPABLE OF TRANSMITTING LINE DATA AND SUPERVISORY INFORMATION AT A PLURALITY OF DATA RATES

CROSS REFERENCE TO RELATED APPLICATION

This application claims priority of U.S. Provisional Patent Appln. No. 60/506,175 filed Sep. 29, 2003, entitled "Inband Overhead Management Scheme For Optical Fibre Communication Systems" which is incorporated herein by reference for all purposes.

FIELD OF THE INVENTION

This invention relates to a transmitter for the transmission of both data and supervisory information by modulating a low frequency signal bearing supervisory information with higher frequency data information and for transmitting an optical output signal.

BACKGROUND OF THE INVENTION

In transmission systems, the merging of two separate signals having two differing data rates, where a high speed data signal is combined with a lower speed data signal in the form of a supervisory signal is well known. For example Fee et al, in U.S. Pat. No. 5,956,165 discloses a system and method and apparatus that allow for the updating and transmittal of a low data rate signal providing ancillary network data as a rider on a high data rate optical signal. A subcarrier modulated signal is processed and updated by using a drop/insert facility without having to alter the high data rate signal component of the data signal. Since the subcarrier signal can be detected by inexpensive equipment without having to detect and demultiplex the high data rate signal, the approach described offers one solution to the problem of network monitoring. In this system ancillary network management information can be communicated regardless of the quality or loss of the high data rate signal. In addition, by updating the subcarrier signal rider in a cumulative manner, a complete history of the fiber link the modulated optical signal travels on is provided to network management.

U.S. Pat. No. 6,549,311 in the name of Hakki et al. discloses a wave division multiplexing system in which low frequency intensity modulation of the optical channels is avoided in order to reduce or substantially prevent interchannel cross-talk of low frequency telemetry signals by phase modulating the low frequency telemetry signal so as to recover the transmitted signal at the receiver. The system includes multiple transmitters and receivers. Each transmitter includes an optical source, such as a laser, a radio frequency generator having a low frequency telemetry signal impressed thereon, and an optical phase modulator. The phase modulated low frequency telemetry signal generated by each transmitter is combined using a multiplexer before being amplified and transmitted through a single optical fiber. A demultiplexer receives the transmitted signal and separates it into respective optical channels based on the particular frequency of each transmitter. Respective signals for each optical channel are transmitted to an associated receiver. Each receiver includes a splitter for tapping off a portion of power into a first portion and a second portion. A data recovery device reestablishes data information from the first portion of power, while an interferometer and detector are used to recover the low frequency telemetry information from the second portion of power. Although these systems appear to perform their intended function, there is a need for a communications system that is capable of simultaneously transmitting low data rate supervisory signals with high speed line data wherein the line data rate may vary.

The communication system in accordance with this invention is relatively inexpensive to build and is less complex than many of the systems proposed by others. The system in accordance with this invention relies on the line data rate for the data signals and in dependence of the data rate the modulation index is maintained or varied. The lower line data rates use a larger modulation index, and vice versa. Such a control means is simple and can be implemented conveniently and cost effectively in the transmitter without requiring receiving feedback from the receiver on the signal error rate. This is a significant advantage. Furthermore, this invention provides a simple scheme which allows a same transmitter to be used to impose supervisory data signals on data signals that may have a variety of different line rates. Such a transmitter can be advantageous in a system wherein different line data rates are utilized throughout a network, for providing a network of transmitters and receivers having different line data rates, and wherein supervisory signals are provided with the line data information for transmission along an optical fiber.

It is an object of the invention to provide a transmitter that allows data and supervisory information to be combined for optical transmission to a receiver at a different locale.

It is an object of the invention to provide a simple and inexpensive transmitter, which is capable of transmitting data and supervisory information and different transmission rates and wherein a modulation index is varied in dependence upon a varying incoming data rate.

SUMMARY OF THE INVENTION

In accordance with an embodiment of this invention, there is provided, an optical transmitter, transponder or transceiver for sending supervisory data signals and line data signals as a composite optical signal through an optical fiber link comprising:

a) circuitry for receiving an electrical line data signal having a line data bit rate and for receiving an electrical supervisory data signal;

b) circuitry for converting the received electrical supervisory data signal into an electrical modulated supervisory data signal having one or more predetermined supervisory carrier frequencies and a supervisory carrier frequency amplitude;

c) a driver, preferably in the form of a current or voltage driver for driving the received line data signals to a laser module;

d) a laser module coupled to the driver for sending as a single combined signal, a transmit signal comprising the line data signal and the converted supervisory data signal having a modulation index that is the ratio of an optical power associated with the supervisory data signals to an optical power associated with the line data signals; and, e) control circuitry for controlling the modulation index by varying the supervisory carrier frequency amplitude in dependence upon the line data bit rate.

In accordance with another aspect of the invention, there is provided, an optical, transmitter for sending supervisory data signals and line data signals as a composite signal over an optical fiber link, comprising:

a) means for receiving an electrical line data signal having a line data bit rate;

b) means for receiving an electrical supervisory data signal;

c) a laser for transmitting a single transmit signal comprising the line data signal and the supervisory data signal having a modulation index that is the ratio of an optical power associated with the supervisory data signals to an optical power associated with the line data signals;

d) control circuitry for controlling the modulation index by varying a carrier frequency amplitude of the supervisory data signal in dependence upon the line data bit rate.

There is further provided, a network comprising a plurality of the optical transceivers as defined above, wherein the plurality of transceivers are interconnected so that data can be transmitted from one transceiver to another, and wherein the data bit rate of at least two of the plurality of transceivers is substantially different and wherein the modulation index is varied in dependence upon a varying data rate.

BRIEF DESCRIPTION OF THE DRAWINGS

Exemplary embodiments of the invention will now be described in conjunction with the drawings in which.

DETAILED DESCRIPTION

Figure 1:
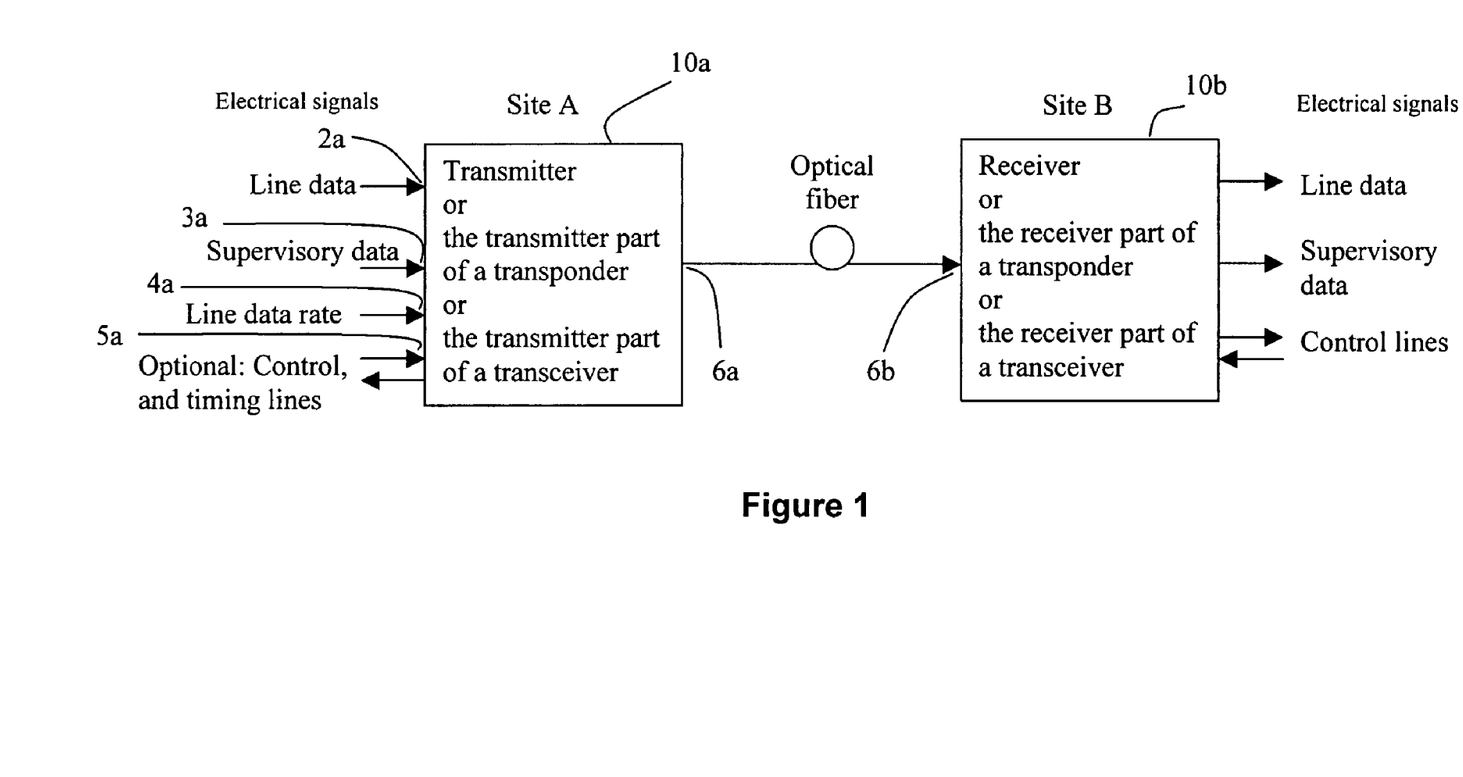
FIG. 1 is a block diagram illustrating a transmitter, received transmission scheme having an optical fiber link therebetween.

Referring now to FIG. 1 a transmission system is shown having a transmitter 10a at site A and a receiver 10b at site B. The transmitter 10a and receiver 10b may be very close together or alternatively, hundreds or more kilometers apart. Within this specification the word transmitter will be used interchangeably with the words transponder or transceiver. Thus, the transmitter may be a stand-alone transmitter or may by a transmitter, which is a part of a transponder or transceiver.

The transmitter 10a has input ports 2a, 3a, 4a, and 5a for receiving line data, supervisory data, a line data rate, and optional control signals, respectively, in the form of electrical signals; and the transmitter includes a single output port for carrying optical signals along an optical fiber to the receiver 10b. In a duplex system a second optical fiber is provided for oppositely propagating optical signals directed to a receiver adjacent to the transmitter 10a and from a transmitter adjacent to the receiver 10b.

The receiver 10b has an input port for receiving a composite optical signal from the transmitter 10a and has output ports that provides same electrical signals after a received optical signal has been demodulated to electrical signals in the form of line data and supervisory data. The receiver also has control data lines. The receiver can either be a stand-alone unit or can be a part of a transponder or a transceiver.

Sub-carrier modulation is used to implement supervisory data transmission composite with high-speed line data.

Within the transmitter 10a, the supervisory data is first modulated by one of an FSK, PSK or MPSK modulator using carrier frequencies typically in the range of 50 KHz to 2000 KHz. The data rate of the line data is expected to be in the range of 40 Mb/s to 12.5 Gb/s. The modulated signal is then amplitude modulated on top of the optical line data. As a result, the modulated supervisory data is combined with the line data and converted to an optical signal illustrated in FIG. 3d, being transmitted over an optical fiber 29.

Within the receiver 10b, the supervisory signal is first separated from the line data by an envelope detector and then demodulated by a FSK or PSK or MPSK demodulator according to the type of modulator in the transmitter 10a. The supervisory data is recovered after the demodulation. This is explained later in greater detail along with the description of FIG. 5.

In operation, the transmitter 10a has electrical input signals and an optical output signal, transmitted on optical fiber 29; a high speed line data input port 2a receives a line data signal having data typically transmitted in the range of 40 Mb/s to 12.5 Gb/s.

The input port 3a of the transmitter 10a receives supervisory data input that carries information related to network elements' status, alarms, messages and other information to control and maintain the network of which the transmitter 10a forms a part.

The transmitter 10a also includes line data rate input received at port 4a, bearing information related to the data rate being received by the transmitter 10a. A primary function of the transmitter 10a is to combine the two data sources, the line data signal and the supervisory data signal that come from two different electrical inputs and output them as a single optical output signal.

In operation, the receiver 10b receives the combined optical signal on input port 6b and coverts it to electrical output signals including a line data output that carries high speed data, typically in the range of 40 Mb/s to 12.5 Gb/s, and a supervisory data output that carries information about network elements' status, alarms, messages and other information to control and maintain the network. The supervisory data rate of the supervisory signal or channel can be in the range of 300 b/s to some 1 Mb/s.

Figure 2A:
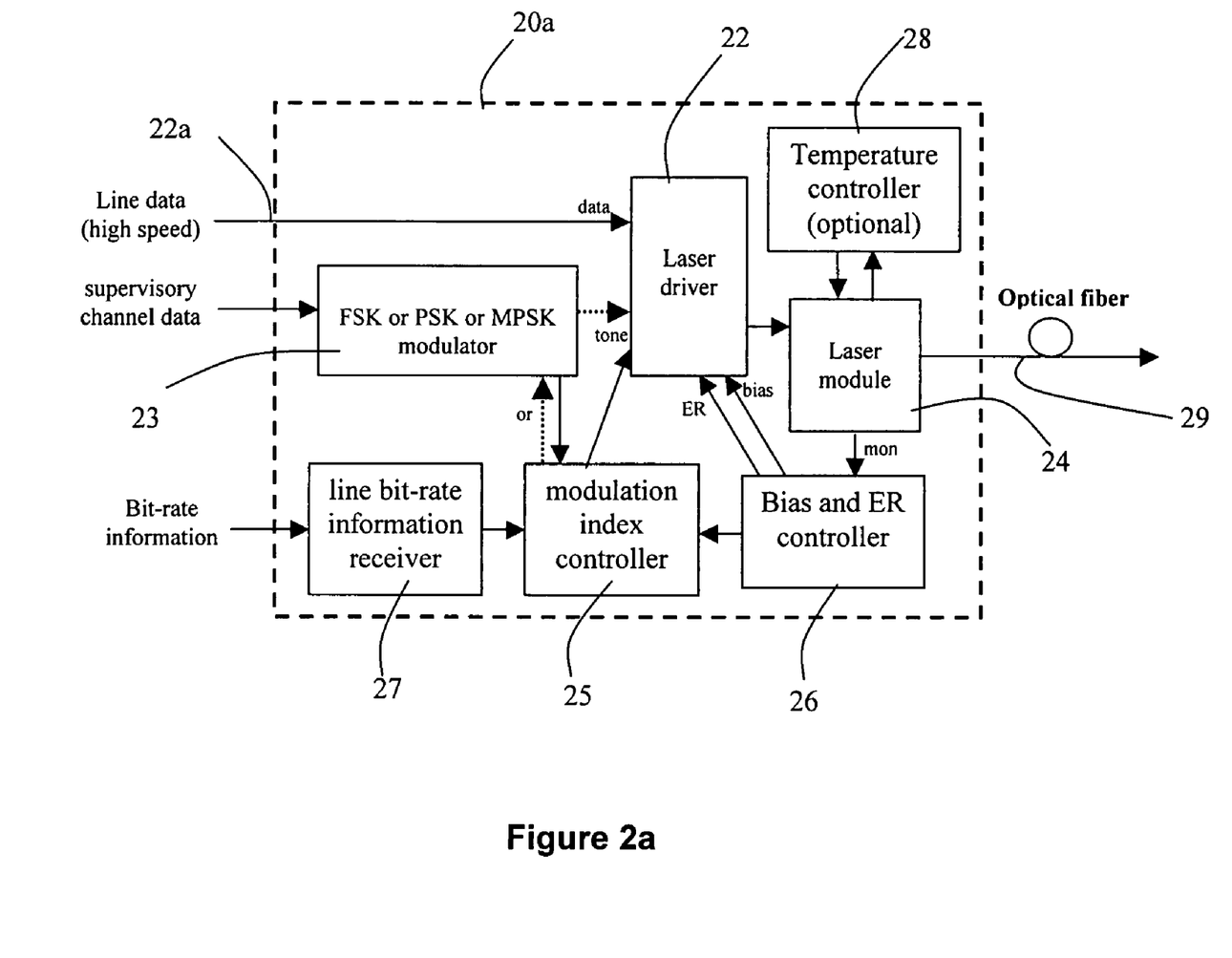
FIG. 2a is a detailed block diagram of a transmitter having a driver with a tone input.

Referring now to FIG. 2a, a first detailed embodiment of an optical transmitter 20a in accordance with the invention is shown. The transmitter includes a modulator 23 coupled to the input port 23a for receiving the supervisory data input signal and for modulating it using an FSK, PSK or MPSK modulation scheme. A current or voltage driver 22 is coupled to receive the high speed line data signal from the input port 22a and to receive the modulated signal from the modulator 23, and drives a laser module 24 in dependence upon input signals from a modulation index controller 25 and a bias and ER controller 26. The high-speed signal received by the driver 22 may be single ended or may be a differential signal. A line bit rate information receiver 27 receives bit rate information into the circuit and provides this to the modulation index controller 25.

The driver 22 in this embodiment receives an analog tone input signal, which affects the amplitude of the output signal of the driver 22, and therefore enables addition of a signal to the line data.

The modulator 23 has a built-in amplitude adjustment circuit; the output signal of the modulator is connected to the tone input of the driver shown as a dashed line; the control on the amplitude adjustment is done in dependence upon a control signal sent from the modulation index controller shown as a dashed line.

In the instance that the modulator 23 is not equipped with a built in amplitude adjustment circuit, the modulator's output signal is provided to the modulation index controller which amplifies the signal by a programmable gain amplifier; the amplified signal is then delivered to the tone input of the driver. The gain of the programmable gain amplifier determines the amplitude of the signal delivered to the tone input of the driver 22 and therefore controls the modulation index.

The modulation index controller 25 receives the required modulation index information from the line bit-rate information receiver 27 in a form of a parallel binary word, however this can also be done by an analog signal. The modulation index controller 25 also receives an analog feedback signal from the bias and extinction ratio (ER) controller 26. This analog feedback signal provides a stable and accurate modulation index over temperature and lifetime of the transmitter.

The bit rate information that is received by the bit-rate information receiver 27, is in the form of serial or a parallel binary data, but, alternatively could be an analog signal.

The bias and ER controller 26 sends bias control and extinction ratio control signals in the form of slow varying DC signals to the driver 22. The purpose of this controller is to keep the transmitter's power and extinction ratio constant over temperature and lifetime.

The extinction ratio of a digital optical transmitter is defined as the ratio between the optical power for logical "1" and the optical power for logical "0".

The initial values of bias and extinction ratio are typically set at the time of production by a calibration. After that, over the lifetime of the transmitter, the bias and ER controller circuit 26 ensures that the transmitted power and ER is substantially constant.

The output signal of the driver 22 is a current or a voltage signal, provided to the laser module 24. This is a composite signal that contains the line data and the supervisory data.

The laser module 24 provides an optical output signal, coupled to an optical fiber 29 for transmission to the far-end receiver. The laser module 24 also provides an electrical monitor signal in the form of a current or voltage signal to be used as a feedback signal. This feedback signal is connected to the bias and ER controller 26, or alternatively, the feedback signal may also be provided directly to the modulation index controller 25.

The optical output signal of the laser module 24 is an optical composite signal that includes the high-speed line data, and the supervisory signal on the topside of the composite signal. The amplitude of the supervisory signal relative to the average amplitude of the composite signal is the "modulation index". The supervisory signal in the composite signal has characteristics of amplitude, carrier frequency, or alternating frequencies, alternating phases, if the modulation scheme is based on phase, and rate of change of the frequencies or phases dependent upon the modulation scheme FSK or PSK.

Figure 3A:
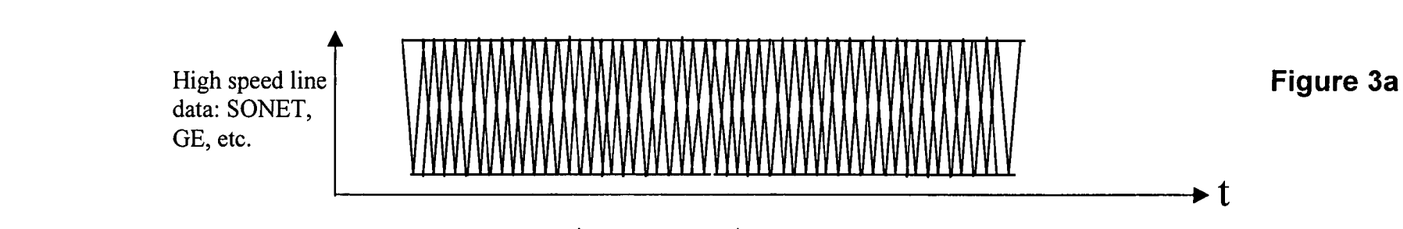
FIG. 3a is a waveform of a high speed line data signal.
Figure 3B:
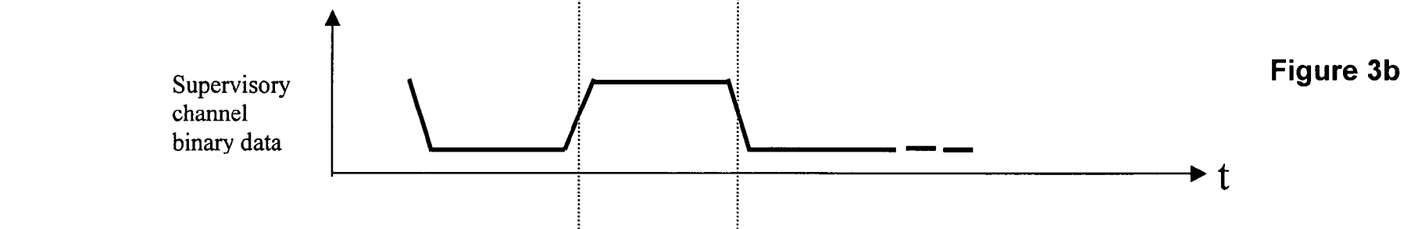
FIG. 3b is a supervisor binary data signal
Figure 3C:
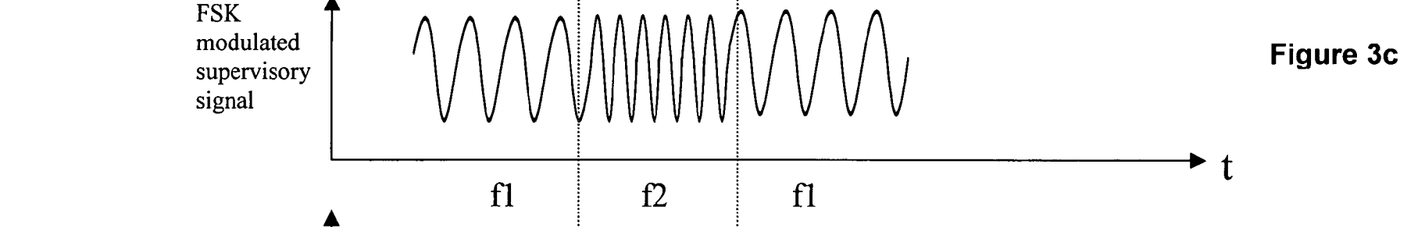
FIG. 3c is modulated binary data signal shown in FIG. 3b.

FIG. 3c is illustrative of a waveform in the transmitter illustrating an FSK modulation.

Many laser modules require a temperature controller to control the temperature of the laser. A temperature controller 28 is shown in FIG. 2a having an output signal which drives a thermal electric cooling (TEC) element in the laser module 24. An input of the temperature controller 28 is connected to a thermistor, within the laser module 29. These two connections between the laser module 29 and the temperature controller 28 enable accurate closed-loop temperature control of the laser within the laser module 29.

Figure 2B:
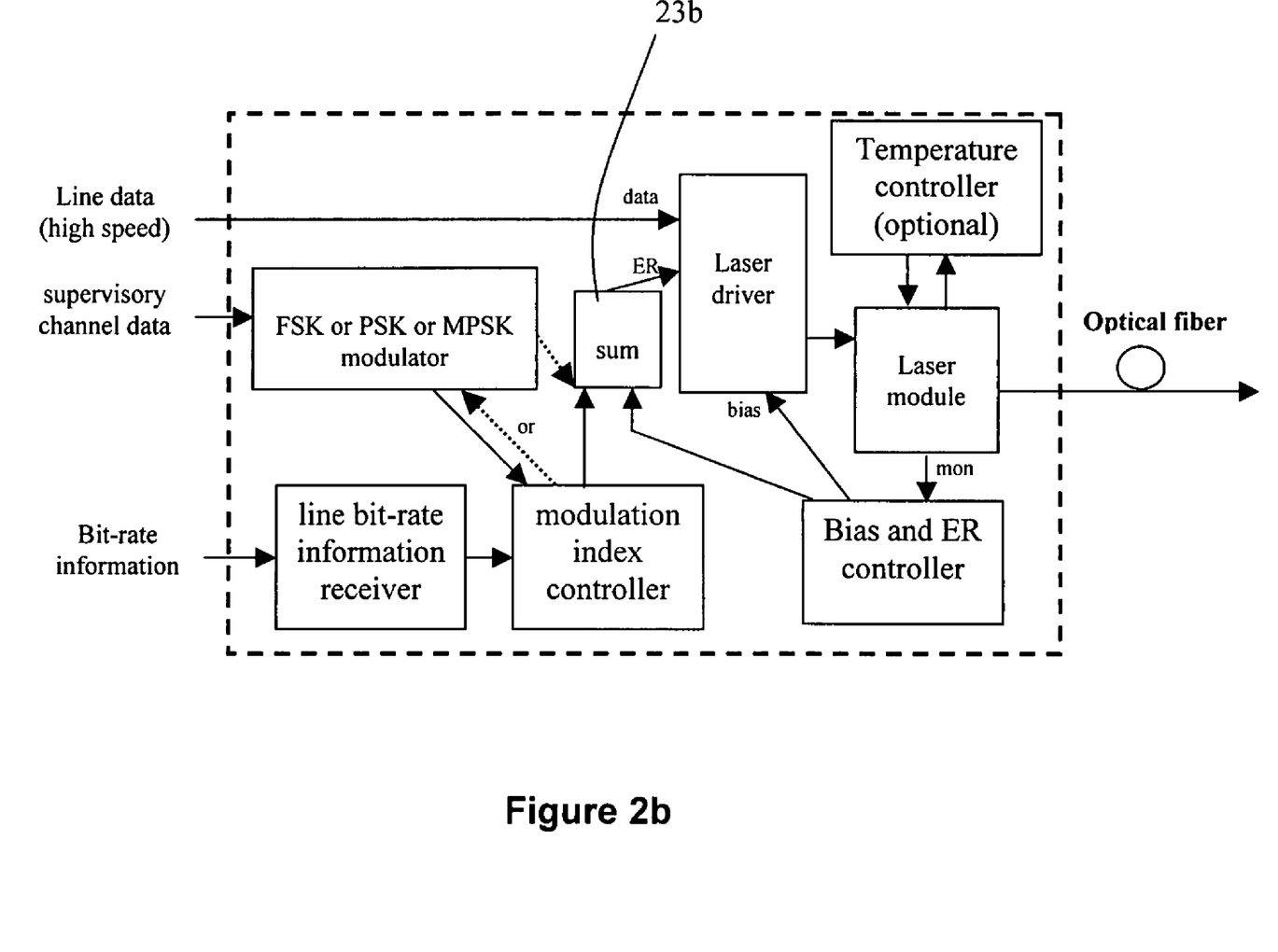
FIG. 2b is a detailed block diagram of an alternative embodiment of a transmitter absent a tone input.

Referring now to FIG. 2b a block diagram is shown illustrating an alternative embodiment of the transmitter shown in FIG. 2a. In this embodiment there is no tone input provided to the driver. The operation of the circuit is similar to that shown in the previous embodiment with the following exceptions. Since the driver 22 has no tone input to provide the modulated supervisory data, a sum circuit 23b is used to combine the ER control input signal to the driver with the modulated supervisory signal received from the modulator or the modulation index controller. This combined analog signal is provided to the laser module 24 at its ER control input. Other aspects of the circuit work in a similar manner as was described heretofore, with respect to FIG. 2a.

Figure 2C:
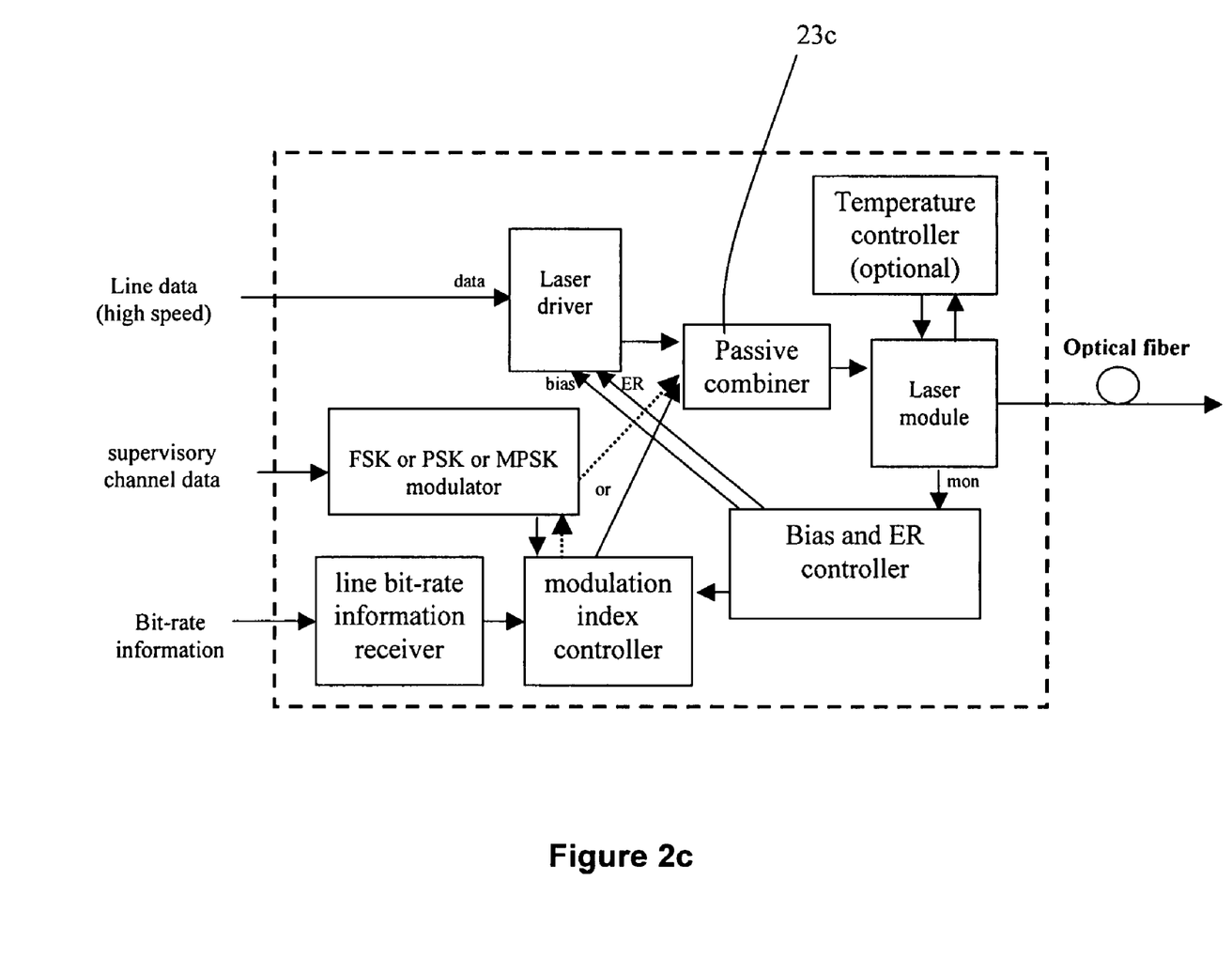
FIG. 2c is a detailed block diagram of an alternative embodiment of a transmitter wherein a passive combiner combines a modulated signal and a signal received from a driver and provides this to a laser module.

Referring now to FIG. 2c a block diagram is shown illustrating yet another alternative embodiment of the transmitter shown if FIGS. 2a and 2b. The explanation of its operation is similar to that of FIG. 2a with the following exceptions:

The driver 22 has no tone input to provide the modulated supervisory data; a passive combiner is used to combine the output signal of the driver that carries the line data with the modulated supervisory data that is received from the modulator or the modulation index controller. This combined analog signal is provided to the laser module 24. In this embodiment the passive combiner 23c is disposed between the driver and the laser module to receive an input signal from the driver, in the form of the high speed line data signal and to receive the FSK, PSK or MPSK modulated supervisory signal and to passively combine them for provision to the laser module 24.

The various blocks of circuitry introduced in FIGS. 2a, 2b, and 2c will now be described in greater detail.

The modulator 23 is provided to modulate by one of FSK, PSK and MPSK modulation depending upon requirements or preference. The modulation requires one or more carrier frequencies. For PSK or MPSK only one carrier frequency is required. For FSK two carrier frequencies are required. This modulator 23 is configured to receive the supervisory channel data via a single ended or a differential input signal. The supervisory channel is a serial, digital, binary signal with a data rate in the range of 300 b/s to 1 Mb/s.

There are several embodiments in which implementation of the circuitry of the modulator 23 can be achieved. A preferred implementation is based on the use of a direct digital synthesizer (DDS) chip. The DDS chip generates sine waves in selected carrier frequencies. The frequencies or the phase of a single frequency can be changed dynamically in speed dependent upon the supervisory data rate, using a dedicated input pin of the DDS, a low pass filter is provided at the output of the DDS for eliminating un-wanted higher frequency components. Some DDS chips provide for control of the amplitude of the output sine signal by utilizing an amplitude control input signal.

The driver 22 has a line data input port capable of receiving various transmission line rates up to, for example 2.7 Gb/s. More complex drivers may also include additional functionality such as those provided by the modulation index controller and of the bias and ER controller.

Referring once again to FIG. 2a, the driver of this type includes two DC control inputs: one for controlling the laser bias current and the other for controlling the extinction ratio, the on/off ratio of the optical signal. Some drivers also include a tone input. The tone input can be used to carry the modulated supervisory signal. The driver sums the tone input signal with the other signals to drive the laser module. The driver may support a closed loop control function to provide a constant modulation index over temperature changes and aging, once a desired modulation index has been established in accordance with an incoming bit rate for the high-speed data signal.

Referring once again to FIG. 2b, the driver 22 of this type includes two DC control inputs: one for controlling the laser bias current and the other for controlling the extinction ratio (ER, the on/off ratio of the optical signal). The laser ER control line can also be used as an input for the modulated supervisory channel. The driver with a simple external circuit 23b sums up the DC bias signal with the AC digital signal of the modulated signal.

In the third embodiment of FIG. 2c the passive combiner 23c has plural inputs and one output. The combiner 23c combines the line date signal received from the driver 22 with the modulated supervisory signal. The passive combiner 23 sums up the contribution of the two signals using passive components such as resistors, capacitors and inductors. A combiner of this type is typically constructed using an inductor connected to the supervisory channel modulator 23 output with a resistor connected to the output of the driver 22. The output of the passive combiner is connected to an input of the laser module 24.

The laser module 24 may be a directly modulated laser; an EML (Electro-Absorbtion Modulated Laser); or a continuous wave (CW) laser diode, coupled to a Mach-Zehnder modulator. Each of the three laser module types may also include one or more of the following components: a TEC (Thermo Electric Cooler), thermistor, and a wavelength locker.

The laser module 24 has a current signal input or a voltage signal input terminal. This input is connected to the output of the driver as is described in the first two embodiments of FIGS. 2a and 2b or to the output of the passive combiner in the embodiment of FIG. 2c.

The laser module has at least one monitor photodiode that provides a current signal proportional to the optical transmission. In some transmitters this signal is used as feedback, in order to provide constant power at the optical output. In some designs, this feedback signal is used also to keep the ER stable. In the instant invention, as described in with reference to FIGS. 2a, 2b and 2c, this feedback signal is used to maintain the modulation index constant once the data rate has been established.

The information related to the line bit rate comes from a local or a remote micro controller. This information is received by the line bit-rate information receiver 27 either via a serial or parallel bus or by logical components using logical gates or by an analog signal.

The output of the line bit-rate information receiver 27 is a digital or an analog signal that carries the required modulation index information. The required modulation index depends upon the line data rate as well as the frequency of the supervisory channel and the data rate of the supervisory channel. In the instance of carrier frequencies in the range of 80 KHz and supervisory data rate of 9.6 Kb/s, the following modulation index for various line data rates is hereby provided, by way of example.

15%—for SONET OC3 or SDH STM1 (155 Mb/s).
10%—for SONET OC12 or SDH STM4 (622 Mb/s).
5%—for gigabit Ethernet or 1 Gb fiber channel (1.25 Gb/s).
5%—for SONET OC48 or SDH STM16 (2.488 Gb/s).

These modulation index values are rounded to the closest 5%. The values may vary depending on the specific circuit design.

The line bit-rate information receiver 27 and the modulation index controller can be integrated into a single functional block.

The aggregation of the ER control signal with the modulated signal is provided by modulation index controller 25, which is an op-amp, based summing circuit. The summing circuit includes an input that controls the amplitude of the modulated signal and therefore controls the modulation index of the optical transmission signal. This relates to a primary aspect of this invention.

In operation, the bias and ER controller 26 sends bias control and ER control signals to the driver 27. These are slow, varying, DC signals. The purpose of this controller 26 is to keep the power of the transmitter and ER constant over temperature and lifetime. The initial values of bias and ER controller 26 are typically set at the time of production, after calibrating. Subsequently, over the lifetime of the transmitter, the bias and ER controller 26 maintains the transmitted power and ER to be substantially constant.

The bias and ER controller 26 receives a feedback signal from the laser module that is proportional to the output power of the transmitter. Some drivers are capable of extracting the ER information of the optical transmitted signal, based on reading the feedback signal.

The temperature controller 28 is optional, and is only required with laser modules that include a built-in TEC. The temperature controller drives the TEC so as to maintain the laser in a constant temperature in dependence upon the temperature of the laser.

Figure 6:
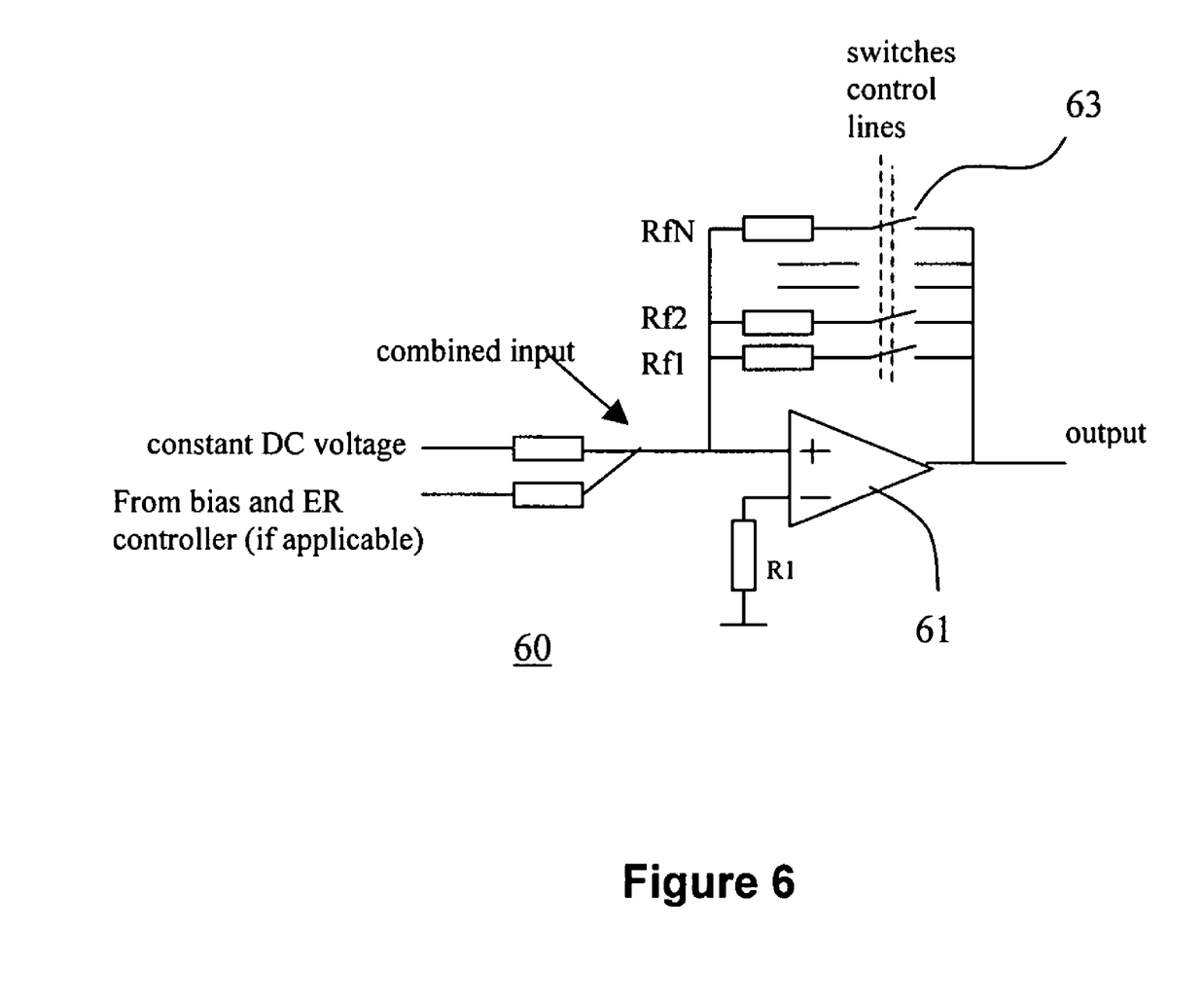
FIG. 6 is a circuit diagram of a controlled gain amplifier for use in varying the modulation index.

Although other means of controlling the modulation index have been described, other embodiments are within the spirit and scope of this invention. For example, the modulation index controller 25 can be implemented using a controlled gain amplifier 60, as shown in FIG. 6. The controlled gain amplifier 60 is part of the modulation index controller 25 shown in FIGS. 2a, 2b and 2c and is based on an operational amplifier 61 in a standard non-inverting configuration but with multiple feedback resistors $Rf_1$, $Rf_2$, ... $Rf_n$ having different values. A switch in an array of switches 63 selects only one resistor to be used at a time. The switch's position is selected the input signal to the modulation index controller. The gain of the circuit is given by $G=(Rfi+R1)/R1$. The feedback resistor $Rf_i$ may have n numbers of various values and therefore there are n numbers of gain figures. If multiple switches are activated at a time the number of gain figures can be as high as two to the power of n. With reference to the circuits shown in FIGS. 2a and 2c, the operational amplifier circuit amplifies a constant DC voltage with added contribution from the bias and ER controller circuit. Therefore the output signal of the operational amplifiers circuit is a controlled DC signal that is also stabilized by the feedback signal that comes from the bias and ER controller circuit. The output signal of the operational amplifiers circuit is also the output of the modulation index controller 25.

In FIG. 2b the operational amplifier circuit amplifies a constant DC voltage and the output signal of the operational amplifiers circuit is a controlled DC signal. This signal is the output of the modulation index controller 25.

To set a higher modulation index for lower data rates, the switches are set accordingly. For example: if higher output voltage results in higher modulation index then, for low data rate the selected switch contact a resistor (Rfi) with high value. The outcome will be higher output voltage at the operational amplifier circuit's output and therefore higher modulation index. For high data rate the selected switch must contact a resistor with low value.

Figure 3D:
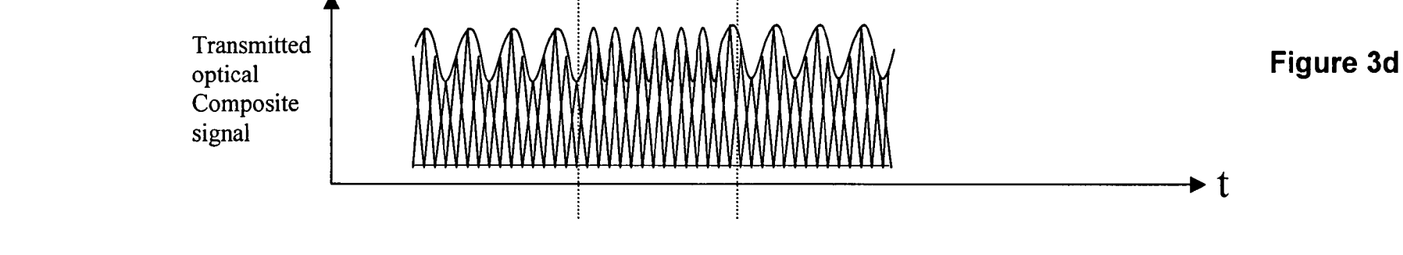
FIG. 3d is the transmitted optical signal which is a composite of the signals shown in FIGS. 3a and 3c.

Referring now to FIGS. 3*a* through 3*d*, four signal waveforms plotted as function of time are shown. FIG. 3*a* illustrates a high-speed line data signal; FIG. 3*b* shows a supervisory channel binary data signal; FIG. 3*c* depicts an FSK modulated supervisory signal shown in FIG. 3*b*; and, FIG. 3*d* illustrates combined waveforms of the transmitted optical composite signal.

Figure 4:
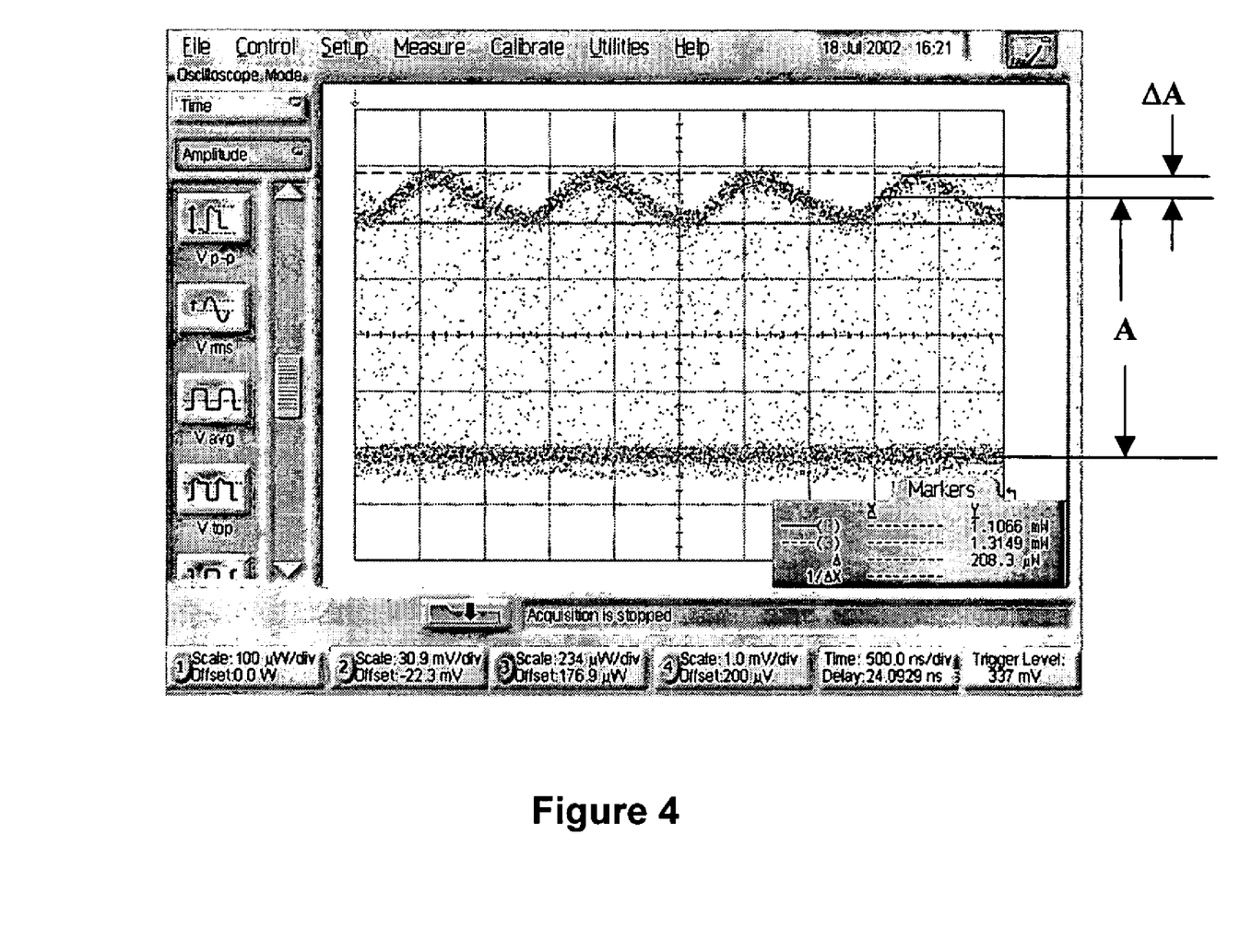
FIG. 4 is a pictorial view of the modulated output signal.

The optical signal with modulation, as tested, is shown in FIG. 4. The modulation index is defined as the optical power associated with the FSK signal to the optical power associated with the line data, i.e.

$$\text{Modulation\_Index} = \frac{\Delta A}{A} \times 100\%$$

By way of example, a specific frequency plan and FSK signal parameters are described. The transmit and receive (Tx and Rx) carrier frequencies on the module are chosen in the range of 50 kHz to 200 kHz. Two separate carrier frequencies are used for each end of the supervisory channel depending on whether the module is a caller (Tx) or the called (Rx) device. The exact frequencies and the LO frequencies were selected to avoid interference from the local transmitter to the local receiver. Such interference might occur by RF radiation or through the power supply lines. Therefore the receiver was designed to receive two FSK frequencies while the collocated transmitter transmits two other FSK frequencies.

The design parameters are summarized in the table below.

| Direction | Caller side | | Called side | |
|---|---|---|---|---|
| Tx | Space | 72.8 kHz | Space | 172.8 kHz |
| Tx | Marker | 87.2 kHz | Marker | 187.2 kHz |
| Rx | Space | 172.8 kHz | Space | 72.8 kHz |
| Rx | Marker | 187.2 kHz | Marker | 87.2 kHz |

The FSK modulation parameters are summarized in the following table. They were selected to take advantage of the FSK modulation and to optimize the demodulation performance for 9.6 kbps data rate.

FSK Modulation Parameters

| Item | Design value |
|---|---|
| Data rate | 9.6 kbps |
| f2 (marker) -f1 (space) | 14.4 kHz |
| Signal bandwidth (>98% power) | ~33.6 kHz |
| FSK frequencies | 72.8 KHz, 87.2 KHz or 172.8 KHz, 187.2 KHz |

One implementation of the modulator is as follows:

The central element of the modulator 23 is the DDS chip. The DDS is a numerically controlled oscillator with very accurate frequency control and frequency modulation capability.

The two frequency registers in the DDS chip are used to define the two output frequencies of FSK modulation, and a dedicated frequency-select pin is used to select one of the two frequencies.

The DDS has a standard serial interface that allows the device to interface directly with a micro-controller. After power-up of the circuit, the micro-controller writes into the two frequency registers of the DDS, two numbers. These numbers define the two FSK frequencies. Then, the logical level of the frequency-select pin of the DDS selects in real-time the frequency at the DDS output.

Figure 5:
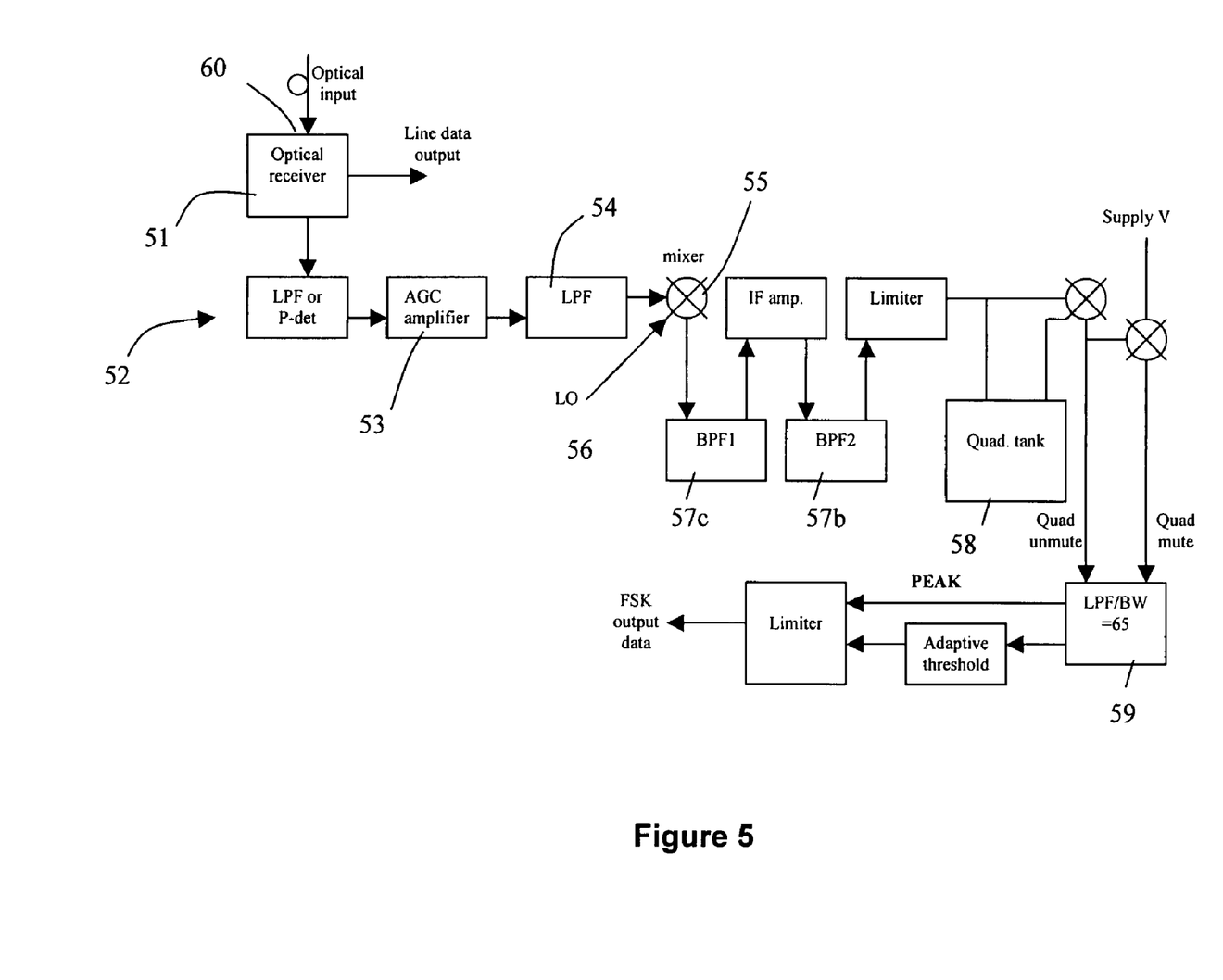
FIG. 5 is a detailed schematic diagram of a receiver shown in FIG. 1.

A block diagram of an FSK receiver 10*b* is shown in FIG. 5. The receiver includes a narrow band, non-coherent, FSK demodulator, which forms a part of circuit 10*b* of FIG. 1. Most of the functions of the FSK receiver can be implemented by using a single commercially available chip that includes the following functions: AGC amplifier, Mixer, IF amplifier, limiter amplifier and the quadrature detector for the FSK demodulation. Specific frequencies and other design parameters are given here as examples, however these design parameters can be optimized in various ways.

The receiver has an optical fiber input port 60. A photo-diode based optical receiver detector 51 converts the received optical signal to electrical signal. The optical receiver 51 has two output signals: a line data output signal that caries the high-speed optical channel information and a second output that is followed by a low pass filter 52 (LPF) or an envelope detector EDET, which serves as an AM detector. An AGC amplifier 53 amplifies the signal which is provided to a low-pass filter 54 to remove the image frequency component before being fed to a mixer 55. The filtered signal is mixed with the sine signal that comes from the LO (local oscillator) 56. The LO output has standard IF frequency of 455 kHz, which is subsequently band-pass filtered, amplified and demodulated to a base-band signal. The base-band signal is then passed through a "peak detector" where it is sliced and level shifted to a NRZ format in voltage levels of TTL (or LVTTL).

The low-pass filter is designed as an image filter to remove any remaining line data spectrum component above 700 kHz to avoid its folding back into the IF frequency after mixing with the LO. The low-pass filter is a high-order filter with a pass band at 300 kHz and stop-band at 700 kHz. It provides about 50 dB attenuation at above 700 kHz.

The FM demodulator chip is the primary component of the FSK demodulator. The low pass filtered signal is first matched to the input impedance of the chip and is then mixed with a LO frequency designed to shift the RF signal to 455 kHz IF frequency. The 455 kHz IF is designed to permit direct connection to industry standard 455 kHz ceramic filters. The output of the mixer is passed through two stages 57*a*, 57*b* of band-pass filtering and amplifications, which provides significant out-of-band noise rejection and about 90 dB signal amplification. After the second stage of amplification, the signal waveform is essentially clipped. The signal from the second limiting amplifier is provided to a quadrature detector, which includes a phase comparator and a quadrature tank 58. The output of the phase detector is low-pass filtered by filter 59 to acquire the base-band signal. The base-band signal is available at two pins with 180-degree phase shift.

The band-pass filters are used to eliminate out-of-band noise and interference after the mixer while allowing the desired FSK signal to pass through with little distortion. The band-pass filters used in the demodulator are 455 kHz ceramic filters with 40 kHz stop bandwidth. The benefits of using ceramic filters are its high frequency selectivity and out of band noise attenuation of over 40 dB, and direct connection to the chip without any external matching circuitry.

The quadrature tank 58 is used to perform frequency selective phase shifting at the IF frequency. An important design parameter is the Q-factor, which affects three aspects of the demodulator: distortion, maximum modulated peak deviation and output amplitude. The Q-factor for the quadrature tank was selected to be in the range of 10 to 20, which provides a good trade off between linearity and output amplitude.

The output of the chip is passed to the peak detector comprising a comparator/differential amplifier, an adaptive DC estimator and a slicer/detector. The output of the peak detector is the demodulated FSK data.

The LO signal is generated by a second DDS on the module. Using the DDS is results in a LO clean sine wave with configurable frequency. The two DDS frequencies we use are:

375 KHz—for receiving FSK frequencies of 72.8 KHz and 87.2 KHz.

275 KHz—for receiving FSK frequencies of 172.8 KHz and 187.2 KHz.

Of course numerous other embodiments are within the spirit and scope of this invention.

What is claimed is:

1. An optical transmitter, transponder or transceiver for sending supervisory data signals and line data signals as a composite optical signal through an optical fiber link comprising:
    a) means for receiving a line data signal in the form of an electrical signal having a line data bit rate;
    b) means for receiving a supervisory data signal in the form of an electrical signal;
    c) means for converting the supervisory data signal into a modulated supervisory data signal having one or more predetermined supervisory carrier frequencies and a supervisory carrier frequency amplitude;
    d) a driver for driving the line data signal to a laser module;
    e) the laser module coupled to the driver for sending as a single combined signal, the composite optical signal comprising the line data signal and the modulated supervisory data signal having a modulation index that is the ratio of an optical power associated with the supervisory data signal to an optical power associated with the line data signal;
    f) circuitry for receiving line data bit rate information; and,
    g) control circuitry for controlling the modulation index by varying the supervisory carrier frequency amplitude in dependence upon the line data bit rate.

2. An optical transmitter, transponder or transceiver as defined in claim 1, comprising:
    means for combining the modulated supervisory data signal with the line data signal for generating a composite electrical signal for providing to one of the driver and the laser module.

3. An optical transmitter, transponder or transceiver as defined in claim 1 wherein the modulated supervisory data signal is provided to the driver with the line data signal.

4. An optical transmitter, transponder or transceiver as defined in claim 2, wherein the supervisory data signal is a binary signal.

5. An optical transmitter, transponder or transceiver as defined in claim 1, wherein the control circuitry for controlling the modulation index is for varying the supervisory carrier frequency amplitude in dependence upon the line data bit rate in such a manner as to decrease the modulation index as the line data rate increases.

6. An optical transmitter, transponder or transceiver as defined in claim 1 wherein the means for converting the supervisory data signal includes means for encoding data within the signal in either an RZ or NRZ format.

7. An optical transmitter, transponder or transceiver as defined in claim 6 wherein the means for converting the supervisory data signal includes FSK, PSK or MPSK modulation.

8. An optical transmitter, transponder or transceiver as defined in claim 1, wherein the control circuitry for controlling the modulation index is for varying the supervisory carrier frequency amplitude in dependence upon the line data bit rate in such a manner as to increase the modulation index as the line data rate decreases.

9. A method for transmitting data in optical transmitter or transponder comprising the steps of:
    a) receiving a line data signal having a line data bit rate;
    b) receiving a supervisory data signal;
    c) converting the received supervisory data signal into a modulated supervisory data signal having one or more predetermined supervisory carrier frequencies and a supervisory carrier frequency amplitude;
    d) driving the received line data signals;
    e) sending as a single combined signal, a transmit optical signal comprising the line data signal and the modulated supervisory data signal having a modulation index that is the ratio of an optical power associated with the supervisory data signals to an optical power associated with the line data signals;
    f) receiving incoming line data bit rate information; and,
    g) controlling the modulation index by varying the supervisory carrier frequency amplitude in dependence upon the line data bit rate.

10. A method as defined in claim 9, wherein the step of controlling the modulation index by varying the supervisory carrier frequency amplitude in dependence upon the line data bit rate, comprises the step of:
    generating one or more control signals in dependence upon the line data rate information, for provision to a modulation index controller;
    using the one or more control signals to control the amplitude of the supervisory data signal using a modulation index controller function or by changing an amplitude of a DDS output signal included within an FSK, PSK or MPSK modulator.

11. A method as defined in claim 9, wherein the step of controlling the modulation index by varying the supervisory carrier frequency amplitude in dependence upon the line data bit rate includes the step of decreasing the modulation index as the line data rate increases.

12. A method as defined in claim 11, wherein the step of decreasing the modulation index is performed by providing control signals to a controlled gain amplifier of a modulation index controller.

13. A method as defined in claim 9, further comprising the step of combining the supervisory signal with the line data signal after performing step (g).

14. An optical transmitter for sending supervisory data signals and line data signals as a composite signal over an optical fiber link, comprising:
  a) means for receiving a line data signal having a line data bit rate;
  b) means for receiving a supervisory data signal;
  c) a laser for transmitting a single transmit signal comprising the line data signal and the supervisory data signal having a modulation index that is the ratio of an optical power associated with the supervisory data signals to an optical power associated with the line data signals;
  d) control circuitry for controlling the modulation index by varying a carrier frequency amplitude of the supervisory data signal in dependence upon the line data bit rate.

15. An optical transmitter, transponder or transceiver as defined in claim 1, optically coupled to a receiver for point to point communication via a pair of optical fibers, wherein two pairs of FSK frequencies are used to lessen crosstalk.

16. An optical transmitter, transponder or transceiver as defined in claim 1, wherein the control circuitry for controlling the modulation index by varying the supervisory carrier frequency amplitude in dependence upon the line data bit rate includes a controlled gain amplifier.

17. An optical transmitter, transponder or transceiver as defined in claim 16, wherein the controlled gain amplifier includes an operational amplifier with a plurality of feedback resistors having different selectable resistances.

* * * * *